United States Patent [19]

Ehrlich et al.

[11] 4,283,211
[45] Aug. 11, 1981

[54] POWER GENERATION BY EXCHANGE OF LATENT HEATS OF PHASE TRANSITION

[75] Inventors: Stefan Ehrlich, Columbus, Ohio; William L. Levenson, Beaver Falls, Pa.

[73] Assignee: Levor, Incorporated, New Brighton, Pa.

[21] Appl. No.: 28,720

[22] Filed: Apr. 9, 1979

[51] Int. Cl.³ .............. F25D 5/00; F01K 25/08; F25C 1/00
[52] U.S. Cl. ................................... 62/4; 62/66; 62/535; 62/532; 60/651
[58] Field of Search ............ 62/4, 76, 535, 542, 62/532, 66; 60/651

[56] References Cited

U.S. PATENT DOCUMENTS

| | | | |
|---|---|---|---|
| 3,137,554 | 6/1964 | Gilliland et al. | 62/535 |
| 3,222,880 | 12/1965 | Findlay | 62/542 |
| 3,714,791 | 2/1973 | Peck | 62/542 |
| 3,892,103 | 7/1975 | Antonelli | 62/532 |

FOREIGN PATENT DOCUMENTS 2394672  1/1979  France .................. 60/651

OTHER PUBLICATIONS

The Heat Content of Frozen Sodium and Calcium Brines, S. R. Jessup, Refrigerating Engineering, pp. 166-169, Sep. 1, 1931.

*Primary Examiner*—Norman Yudkoff

*Attorney, Agent, or Firm*—Robert D. Yeager; Olin E. Williams

[57] ABSTRACT

A power system is provided that uses the latent heat of fusion of water to raise the potential energy of a working fluid to a level that upon release generates power, preferably electrical power. The system is self-sustaining except for the energy that is supplied in water entering the system. The inlet water can be at any temperature within its liquid range under atmospheric or super atmospheric pressure, can advantageously contain the sensible waste heat typical of effluent from fossil fuel or nuclear power plants, can be relatively pure or be contaminated as with sewage or be the medium of a colloidal suspension, or consist of marine or other saline waters. In every case, purification of the water by freezing, for example, desalination, is accomplished without additional power consumption.

A selected working fluid that boils at a temperature substantially below the freezing point of water is brought in the liquid state into contact with the water or other aqueous medium, causing the water to freeze and the working fluid to vaporize under pressure; the produced ice is removed; a portion of the so-produced ice is admixed with a eutectic forming salt to create a cooling medium at a temperature below the condensation temperature of the cooling fluid; the working-fluid vapors are preferably superheated by inlet aqueous medium and are released from autogenic elevated pressure to drive a turbine. Working fluid vapors are condensed by said cooling medium and returned by pumping into contact with inlet aqueous medium.

13 Claims, 2 Drawing Figures

POWER GENERATION BY EXCHANGE OF LATENT HEATS OF PHASE TRANSITION

BACKGROUND OF THE INVENTION

1. Field of the Invention

This invention relates to systems of power generation and more particularly to a system of employment of the latent heat of fusion of water in power generation and water purification, especially desalination.

2. Description of the Prior Art

It is well known that conventional fossil-fuel sources of energy, especially the convenient sources, petroleum and natural gas, are in limited supply, and that the use of nuclear energy to generate power faces the opposition of those who fear nuclear accidents, the latent dangers in nuclear waste, and thermal pollution by effluent cooling water. A need consequently has long been felt for means to supplement the three major but exhaustible energy sources, e.g. petroleum and (or) natural gas, coal and nuclear fuels. Vast expenditures have been made to establish the energy levels at which nuclear fusion will become a reality; and direct utilization of solar energy continues slowly to develop within its limits of practicability. Where modest demands for energy, such as home heating, need be met, heat pumps are frequently employed and are of numerous system configurations as shown by the examples hereinafter given; these all require an auxiliary power supply and consequently continue to rely on one of the aforesaid major energy sources. Power units using temperature differentials of a fluid directly (as opposed to the indirect differentials between boiler and condenser created by combustion of a fossil fuel) have also been developed and, except in peculiar circumstances as in geothermal heat, found impractical primarily because of the low Carnot (theoretical) efficiency. Limitations of systems so far devised are such that practical considerations of pumping, friction, initial investment, debt service, and maintenance overcome the margin of energy recovery attainable.

Closely related to the world-wide short supply, limited reserves, or poor distribution of major fuel sources is the equivalent situation respecting fresh water. Numerous systems have been developed for recovery of fresh water and again their usefulness has been limited to the above-mentioned considerations or, as otherwise expressed, the power requirements of the systems.

A survey of the efforts made and progress so far attained in using the energy available in thermal differences between ocean water at its surface and at its depth is to be found in *Ocean Thermal Energy Conversion* (*OTEC*), edited by Knight, Nyhart, and Stein, copyright by the American Society of International Law, published by D. C. Heath and Co., Lexington, Mass., (1977), 251 pp. especially in Chapters 1 and 2. Available ocean-water temperature differences are at most about 22° C., "which results in a very low theoretical Carnot efficiency of the thermodynamic cycle, namely about 6 percent." In another example, the theoretical Carnot efficiency of the OTEC system is given at 3.3% in *OTEC System Study Report*, Trimble, L. C. et al., Proceedings, 3rd Workshop on OTEC, pp. 3–21, Houston, Texas, May 8–10, 1975, published by the Johns Hopkins University.

In U.S. Pat. No. 4,006,595 to Forbes, a Freon ("FREON" is a registered trademark of E. I. duPont de Nemours and Company for refrigerants; the word is used herein with initial capitalization in recognition of same,) working fluid is employed to power a gas-sealed, flywheel turbine in a system which employs unidentified thermal differences to vaporize the Freon contained in two tanks which alternately supply liquid Freon to a heater, the fluid being transferred thereto in the system by capillary means connected to a high-pressure outlet of the turbine.

Baldwin U.S. Pat. No. 3,531,933 discloses and claims another power system in which the working fluid is a Freon-type refrigerant (dichlorodifluoromethane), and which uses ethylene glycol as a coolant and flooded-type evaporation to condense the working fluid vapors exhausted from a reciprocating piston engine operated by the system.

Numerous patented systems rely on the energy availability of temperature differentials to provide motive power. Siegel U.S. Pat. No. 3,846,984 relates to a temperature-gradient fluid motor which consists of a pair of sealed chambers containing a low boiling fluid with a means for obtaining a temperature gradient between the chambers (one immersed in water, one in cooler atmosphere).

U.S. Pat. Nos. 3,945,218 and 3,953,971 both relate to power systems that utilize elevation differences and available temperature differences on the earth's surface, and that also convert geothermal energy to useful work.

Pecar U.S. Pat. No. 3,987,629 discloses another sealed system for producing motive power from small temperature differentials and contemplates vaporization of part of a working fluid and operation of a turbine by the remaining fluid moved by the kinetic energy of the vapor.

Williams U.S. Pat. No. 4,086,772 discloses a system for converting thermal to mechanical energy including a tube having a plurality of flow converging zones alternating with a plurality of flow diverging zones to vaporize at least part of a working fluid such as carbon dioxide, liquid nitrogen, or flourocarbons and converting part of the energy of the vapor stream in a turbine to mechanical shaft work. Energy is supplied to the system by an ambient thermal energy source, such as wastewater, consisting of a body having a temperature differential with the condensed fluid in the system.

DeMunari U.S. Pat. No. 4,100,744 utilizes thermal differentials such as exist in ocean waters, as mentioned in the above references to the OTEC system, in a thermodynamic cycle that transforms the kinetic energy of the working fluid into mechanical energy.

Cheng et al. U.S. Pat. No. 3,354,083 makes use of the well-known anomaly that water melts at lower temperatures under higher applied pressure in contrast to usual liquids. Pressures of 150 to 200 atmospheres are applied to ice, which melts, and to a selected exchange medium, which freezes. Resulting low-temperature, high-pressure fresh water is employed to operate a turbine and to cool a feed solution, and the resulting solidified exchange medium is brought at atmospheric pressure into contact with additional saline water.

A carefully balanced and well developed thermodynamic system and combination of systems is disclosed in Brola U.S. Pat. No. 4,118,934 for transforming heat at relatively low temperature into power or energy, as in environmental conditioning apparatus. The said heat can be in waste gases, cooling waters from condensers, or other form of low grade energy and its recuperation into power is accomplished by a two-fluid thermodynamic cycle.

SUMMARY OF THE INVENTION

In contrast to any of the above examples of, on the one hand, heat pumps where a power input must be provided, or, on the other hand, of the use of small temperature differentials to provide a power source, the system of the present invention does not rely on, and does not need, an ambient temperature differential, but uses instead a single source of heat, in water, and converts the latent heat of fusion of water to mechanical shaft power, or, ultimately, to electrical power in a Rankine cycle. Although the system of this invention is designed to operate basically on the extracted heat of fusion of water (80 calories per gram), the heat frequently uniformly contained (i.e., the sensible heat) in ambient water, wastewater, or effluent cooling water, as from a fossil-fuel or nuclear power plant, is nevertheless equally available to the system and will in most instances offset the auxiliary power requirements of operating the system. The sensible heat of ambient water may, of course, be increased by preheating it in a solar device.

It is an attained object of the invention therefore to provide a system for the extraction in the form of power, either as electrical or mechanical energy, of the latent heat of fusion of water.

Another object of the invention is the provision of a system for recovery of energy from water having a net surplus of outlet mechanical or electrical power and of sufficient flexibility to utilize not only the latent heat of fusion of water but also that heat content of the water above its freezing point.

A further object of the invention is the provision of a system for the recovery as mechanical or electrical power of the energy in water at low temperatures at or near its freezing point, which system can nevertheless employ apparatus of the size currently employed in conventional power plants, and hence is amenable to existing cost and engineering specifications.

Yet another object of the invention is the provision of a system for recovery of mechanical or electrical power from saline or brackish water that can be at or near its freezing point combined with the desalination of the saline or brackish water by freezing and consequent recovery of ice with melting to provide desalinated water.

An additional object of the invention is the provision of a system for recovery of mechanical or electrical power from wastewater at low temperatures and in which contaminants colloidally suspended are denatured by freezing and precipitated after melting, which yields clarified effluent and an easily dewatered deposit.

The system of invention consists fundamentally of a thermodynamic cycle of several functions: water at a temperature of 0° C. or thereabove, or brackish water, sea water or other saline water, or wastewater at or above its freezing point, is brought into heat-exchange contact with the liquid phase (condensate) of a working fluid, or refrigerant, hereinafter usually termed working fluid, having a boiling point significantly below the freezing point of water or of the saline water, whereby the water is frozen and gives up its latent heat of fusion which is absorbed by the working-fluid condensate as its latent heat of vaporization, the working-fluid condensate thereby being vaporized by that exchange of latent heats of phase transition at autogenic pressure and the vapor is superheated to approximately the temperature of the inlet water; the superheated vapor is released in a turbine to create mechanical shaft power which by conventional mechanical and electrical means is converted to electric power.

The expansion of the working-fluid vapor may be complete and may release the working vapor to atmospheric pressure or may be incomplete so that the expanded working-fluid vapor exits from the turbine under a residual overpressure. The cooled and expanded working-fluid vapor flows from the turbine to a condenser wherein it is further cooled and fully liquified by condensation under atmospheric pressure or under such superatmospheric pressure that has remained from incomplete expansion of the working-fluid vapor. Thereafter the condensate flows to pump.

A portion of ice is withdrawn from contact with the vaporized working fluid, passes into indirect heat-exchange contact with a eutectic brine such as calcium chloride brine in a heat-exchanger and is therein sub-cooled to a temperature below the boiling point of the working fluid; the sub-cooled ice is thereafter fed to the said condenser where it is mixed with calcium chloride or other eutectic former and contacted with the expanded working-fluid vapor from the turbine. The mixing of the sub-cooled ice with a eutectic former instantly commences eutectic melting. The melting of the eutectic salt-ice mixture absorbs the latent heat of fusion of ice and the heat of solution of the eutectic salt. These heats are absorbed from the expanded working-fluid vapor as its latent heat of vaporization and thereby the vapor is condensed by the exchange of latent heats of phase transition. The resulting eutectic brine is then recycled into indirect heat-exchange contact with inflowing ice in the heat exchanger. The eutectic brine is withdrawn from the heat exchanger, and water is vaporized from the eutectic brine, preferably with solar heat, and recovered solid calcium chloride or other eutectic former is recycled to the condenser to be contacted with the inflowing ice. Liquified working fluid is pumped from the condenser and introduced into heat-exchange contact with additional quantities of input water at a superatmospheric pressure equivalent to that pressure generated by boiling the working fluid. The pump is operated by a small portion of the power generated by the turbine.

Water at ambient temperature introduced into the described system and specifically into heat-exchange contact with liquid working fluid will freeze, and in the balanced system will provide ice necessary as the condensation-cooling source for the eutectic condenser and an excess of ice as well. That portion of ice required for eutectic cooling and condensation of the working-fluid vapor is itself sub-cooled by indirect, countercurrent heat-exchange contact with a eutectic brine formed in, and effluent from, the condenser and then the subcooled ice is forwarded to the condenser to be concomitantly mixed with a eutectic former and brought into heat-exchange contact with vaporized working fluid whereby the expanded working vapor is cooled below its condensation point, condensed and subcooled, and the eutectic ice-salt mixture is melted to a eutectic brine which is subsequently used for subcooling new portions of ice en route to the condenser by indirect heat-exchange contact.

Further advantages and novel features of the invention will become apparent from the following detailed description thereof considered in conjunction with the accompanying drawings, in which:

DESCRIPTION OF THE PREFERRED EMBODIMENTS

In the following description, fresh water at 0° C. is taken as the heat source in order to demonstrate the power that can be produced from water at this lowest available temperature, although it is to be understood that water at an elevated temperature can advantageously be employed. Saline water, when employed as the heat source, will be desalinated by the system; and fresh water can also be recovered in the freezing step of the system from colloidal contaminants, as in sewage or in waste water from drains. If, as would usually be the case, water is introduced at a temperature higher than 0° C., the working fluid will be additionally superheated, and in many instances will generate such additional power as will answer the internal power demands, transport, etc., of the system; but to show the effectiveness of the system even at the lowest possible ambient water temperature, and for purposes of simplicity, a water temperature of 0° C. is assumed in this description and in the examples given in the specification. Use of water at 0° C. further demonstrates the fact that the described system can rely as an energy source solely on the latent heat of fusion of water.

Figure 1:
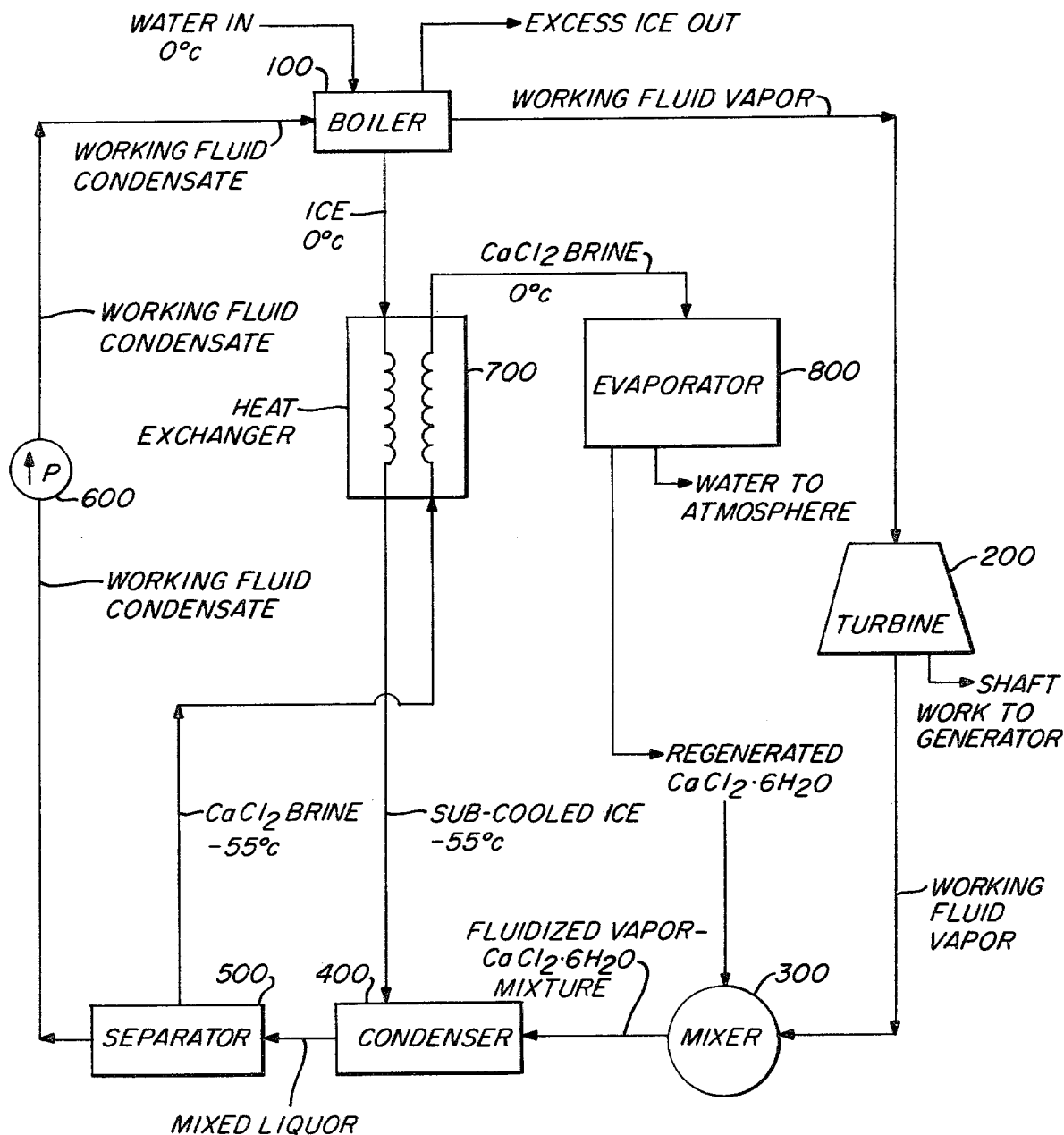
FIG. 1 is a schematic flow diagram of one embodiment of the system of the present invention.

Referring to FIG. 1, fresh water, say from a lake at a temperature of 0° C., is brought to boiler 100 (e.g. a flake-ice machine of generally conventional design) and into heat-exchange contact with a working-fluid (in this case a refrigerant more fully described hereinafter) which is introduced into boiler 100 as a liquid under pressure. Within boiler 100, the working-fluid is brought to boiling temperature at gauge pressure and is superheated to approximately 0° C. If a flake-ice machine is used as boiler 100, indirect heat-exchange contact between the inlet water and the working fluid is employed. A suitable flake-ice machine for use in the process of the present invention is a type such as a Drum Ice Maker with power-driven spiral cutter or Flexible Cylinder Freezer (BRC Machine) manufactured by Flakice Corporation of Metuchen, New Jersey.

Boiler 100 also may be a direct-contact heat-exchange device into which liquid working fluid is pumped and within which inlet water is frozen by direct-contact interchange of latent heats of phase transition with the working-fluid condensate. The condensate is thereby vaporized and superheated to water temperature. A direct-contact boiler requires the pumping of inlet water into the boiler against the autogenous pressure of the vaporizing working fluid but saves the heat-exchanger surface and optimizes the heat transfer process. Exemplary of direct-contact boilers that may be used in the present invention are those described in "The Status of Freeze-Desalination", A. Barduhn, *Chemical Engineering Progress* (71, No. 11); "Vacuum-Freezing Vapor-Compression Desalting Process", Colt Industries, Inc., Office of Saline Water (OSW) Report 295; "Development of a Direct-Freezing Continuous Wash Separation Process SOR Saline Water Conversion", Carrier, OSW Report 23; and "Economic Optimization of the Avco Crystallization Process", Avco Corporation, OSW Contract 14-30-2989.

This exchange of highly concentrated energy available from the latent heat of fusion of water to the latent heat of vaporization of the working fluid can be shown more clearly by reference to some selected refrigerant, for example Freon 12, as the working fluid. Thus at a flow of, for example, Q grams/second of liquid Freon 12, at $-55°$ C. into boiler 100, heat is recovered in the refrigerant equivalent to $-55°$ C.$\times 0.215$ calories/gram/°K. or 11.8 Q cal/g for heating to 0° C.; and 65.1/1.8 cal/g or 36.2 cal/g for vaporizing the Freon 12; the total heat absorbed by the Freon 12 being therefore 48.0 Q cal/sec. Using 80 cal/g as the heat of fusion of water, the amount of ice produced will therefore be 48.0 Q/80=0.60 Q g/sec.

Vaporized, superheated working fluid flows from boiler 100 to an expansion engine or turbine 200, shown entirely diagrammatically but intended to represent a modern expansion turbine having a rated efficiency of about 89%. Adiabatic expansion of the superheated, vaporized working fluid in turbine 200 converts thermal and potential energy into power which can be calculated in cal/sec as the product of the said flow Q in grams per second times the energy loss from the vaporized fluid in calories per gram. The power output of turbine 200 based on the use of Freon 12 can be calculated as follows:

When Freon 12 is employed, the absolute pressure at 0° C. will be 3.05 atmospheres (2.05 atm gauge pressure). Turbine 200 operates upon the basis of the work released by adiabatic expansion and cooling of Freon 12 to atmospheric pressure, the Freon 12 having a specific volume at 0° C. of 57.4 milliliters/g, and, at one atmosphere and a temperature of $-29.8°$ C. (the atmospheric boiling point of Freon 12), of 156 mL/g. The flow-work, which is the work carried out by expansion of the vapor, is thus:

(3.05 atm) $(1.01\times 10^6$ dynes/cm$^2$/atm) $(2.39\times 10^{-8}$ cal/dyne$\times$cm) (57.4 mL/g)$-$(1 atm) $(1.01\times 10^6$ dynes/cm$^2$/atm) $(2.39\times 10^{-8}$ cal $10^{-8}$ cal/dyne$\times$cm) (156 mL/g)=0.46 cal/g.

The internal energy change or the work generated by cooling the vapor, is thus:

29.8° C.$\times 0.22$ cal/g=6.56 cal/g.

Total work delivered is thus 6.56 cal/g+0.46 cal/g=7.02 cal/g. Q being the flow of working fluid in g/sec, then the power delivered to the turbine will be 7.02 Q cal/sec.

Assuming an efficiency of the turbine at 89%, then the power output of the turbine will be:

0.89$\times$7.02 Q or 6.25 Q cal/sec.

subject to a correction for condensation of about 2.5 to 4.5 percent of the vapor to liquid in adiabatic expansion in the turbine, which in practice would be offset by available ambient sensible heat in water at 15°–25° C. The working fluid vapor, cooled and expanded in turbine 200, is subsequently condensed in condenser 400 by exchange of heats of phase transition with a eutectic mixture of ice and CaCl$_2$.6H$_2$O which melts in the process. The heat-exchange contact in condenser 400 may be either direct or indirect. In the case of direct heat-exchange contact in the condenser (FIG. 1), the cooled and expanded working-fluid vapor flows from turbine 200 into mixer 300. In mixer 300 the working fluid vapor stream is mixed with particulate CaCl$_2$.6H$_2$O to form a fluidized mixture which is carried into the condenser 400. The entrainment of CaCl$_2$.6H$_2$O particles in the vapor is accomplished by techniques well-known in the art. $CaCl_2.6H_2O$ is selected for use in the present preferred embodiment because of its low eutectic point ($-55°$ C.) which is advantageously employed in the condensation step hereinafter described.

The salt-laden vapor stream is decelerated as it enters condenser 400 to permit deposition of the entrained salt particles on crystals of subcooled ice present in condenser 400. As the crystals of $CaCl_2.6H_2O$ dissolve, the salt penetrates into the ice and the salt concentration progressively decreases outwardly from the salt crystals to the eutectic level of 29.8 weight percent of $CaCl_2.6H_2O$. This eutectic level moves continuously through the ice to melt it at $-55°$ C. The melting ice absorbs its latent heat of fusion and the dissolving $CaCl_2.6H_2O$ absorbs its heat of solution from the vaporized working fluid.

The nature of the working fluid, or the process parameters taken singly or in combination, are selected to fix the condensation temperature of the working fluid in condenser 400 above the eutectic point of $CaCl_2.6H_2O$ (i.e., $-55°$ C.). Accordingly, the working fluid gives up its sensible heat and its heat of vaporization to the melting ice-$CaCl_2.6H_2O$ mixture, which heats are absorbed by the mixture as the latent heat of fusion of water and the heat of solution of $CaCl_2.6H_2O$. The working fluid is thereby condensed and subcooled in accordance with the precepts of the Rankine power-generating cycle. The condensation process just described, occurred in a direct-contact mode and can be carried out in a variety of the well-known chambers employing such heat exchange means as e.g. falling curtains; fluidized, expanded, and packed beds; etc.

As the ice melts as just described and the working fluid condenses on the surface of the melting ice crystals, a mixed liquor forms in condenser 400. This liquor is drained from condenser 400 to separator 500. This separator may be of any well-known type such as gravity, centrifugal, etc. After separation of the liquor, working fluid condensate passes from separator 500 to pump 600 which forces the condensate to return to boiler 100 to complete the working-fluid cycle.

The other component of the separation process carried out in separator 500 is a calcium chloride brine solution. The $CaCl_2$ brine is removed from separator 500 and passed through a countercurrent heat exchanger 700 in which the brine acts to subcool ice passing from boiler 100 enroute to condenser 400. In heat exchanger 700, the ice is sub-cooled from 0° C. to about $-55°$ C.; the brine is warmed from $-55°$ C. to about 0° C. in transiting from condenser 400 through heat exchanger 700. The warmed brine is discharged from heat exchanger 700 to evaporator 800 where the water is evaporated, preferably by solar energy and (or) wind, and crystalline $CaCl_2.6H_2O$ is regenerated. The regenerated crystalline $CaCl_2.6H_2O$ is suitable for re-introduction to the process. Apparatus and techniques for this evaporation/regeneration process are well known in the art.

Figure 2:
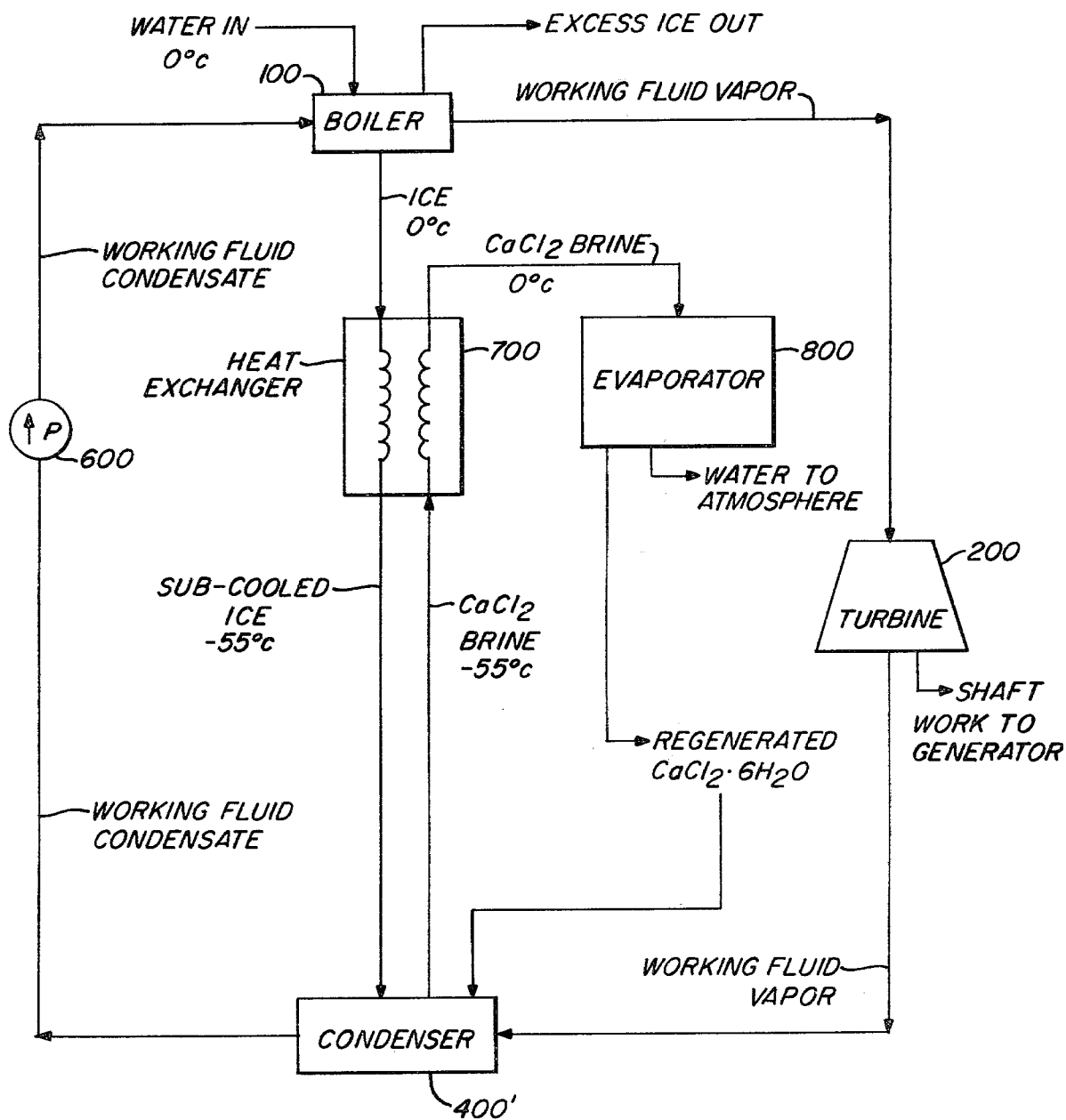
FIG. 2 is a schematic flow diagram of a second embodiment of the system of the present invention.

In an alternate embodiment of the present invention schematically shown in FIG. 2, the working fluid flow is as described above except that the condensing of the working fluid vapor is carried out in condenser 400' by indirect heat exchange contact, e.g. in a flake-ice machine of the type described above. In this embodiment, the subcooled ice and the crystalline $CaCl_2.6H_2O$ are mixed and melted in the chamber of the machine designed for freezing water, and the expanded working fluid vapor is condensed in the chamber designed as the refrigerant boiler. In this embodiment, mixer 300 and separator 500 are not required. The regenerated crystalline $CaCl_2.6H_2O$ produced as before, is transported directly from evaporator 800 to the condenser 400' where it is mixed with sub-cooled ice forwarded from heat exchanger 700.

Heat exchanger 700 must be of a countercurrent, indirect type. It may involve either continuous or discontinuous flow of one heat exchange medium through the other and may utilize a variety of well-known conveyance means.

Only a portion of the ice generated in boiler 100 is forwarded to the condenser 400 (400') through heat exchanger 700; that portion is equivalent to the waste heat retained in the expanded working-fluid vapor leaving turbine 200. The melting of this portion of the ice at $-55°$ C. in condenser 400 (400') and the attendant dissolving of $CaCl_2.6H_2O$ (which has a negative heat of solution) are sufficient to cool the expanded working-fluid vapor below its condensation point and condense it. The portion of the ice generated in boiler 100 that is equivalent to the fraction of heat converted to useful work in turbine 200 is excess ice produced by the system of the present invention. This excess ice has an energy potential for heat exchange purposes outside of the system of the present invention. When saline water is employed as a heat source, the freezing desalinates it and the excess ice is a source of fresh water. When wastewater is employed as a heat source, the water produced as excess ice may be easily clarified when that ice thaws.

To illustrate the thermodynamic balance of direct contact condensation (see FIG. 1), Freon 12 leaves turbine 200 and, via mixer 300, enters condenser 400 as a vapor, carrying about 3 percent by weight condensate, at atmospheric pressure and a temperature of $-29.8°$ C. (the atmospheric condensation point of Freon 12 vapor). The expanded vapor is cooled in condenser 400 to $-55°$ C. by exchange of latent heats of phase transition with the ice-$CaCl_2.6H_2O$ eutectic composition, and is thereby liquified and sub-cooled while the eutectic composition is melted. The latent heat of vaporization and the sensible heat removed from the expanded working vapor in the aforesaid temperature differential are thus absorbed as follows:

39.4 cal/g (latent heat of vaporization)+($55°$ C.$-29.8°$ C.)$\times 0.211$ cal/g/°C. (sensible heat)=44.7 cal/g.

The melting of ice at the eutectic level (29.8 wt. % crystalline $CaCl_2.6H_2O$ and 70.2 wt. % ice) together with dissolving the $CaCl_2.6H_2O$ absorbs the following quantity of heat:

Latent heat of fusion of ice= $-80$ cal/g.

Heat of solution of $CaCl_2.6H_2O = -19.8$ cal/g.

Because a quantity of the eutectic composition containing 1 g ice contains 0.42 g $CaCl_2.6H_2O$, the total heat absorbed by melting this quantity of eutectic composition=$80+8.4=88.4$ cal/g ice, and the amount of ice used in cooling the working fluid is:

$$Q \text{ ice} = \frac{44.7 \text{ cal/g}}{88.4 \text{ cal/g}} = 0.506 \text{ g/sec ice.}$$

It has been demonstrated that the power delivered to turbine 200 is 7.02 Q cal/sec: at a turbine efficiency of 89% the power output is 6.25 Q cal/sec. To pump liquid Freon 12 back to the boiler 100 with a pressure difference of 2.05 atm, liquid Freon 12 having a specific volume of 0.687 mL/g, the work required per gram is:

W = (2.05 atm)(1.01 × 10$^6$ dynes/cm/atm)(2.39 × 10$^{-8}$ cal/dyne × cm)(0.687 mL/g) = 0.034 cal/g.

The work per gram to be delivered to a pump of 85% efficiency is thus $$\frac{0.034}{0.85} \text{ cal/g} = 0.04 \text{ cal/g}$$

and the power required to pump the working-fluid condensate against the autogenic pressure of vaporized Freon 12 in boiler 100 is 0.04 Q cal/sec. In addition to the power required for pumping the working fluid, an additional 0.08 Q cal/sec has been allowed for process work in the system and nominal energy potential losses, such as sub-cooling of the crystalline $CaCl_2.6H_2O$, which were neglected in the calculated energy balance of the cycle. Thus the net power output of the cycle is 6.25 Q cal/sec − 0.04 Q cal/sec − 0.08 Q cal/sec = 6.13 Q cal/sec.

Examples of substances, primarily salts, which form suitable eutectic compositions are, preferably, calcium chloride, sodium chloride, magnesium chloride, and zinc chloride. Any suitable refrigerant such as ammonia, lower hydrocarbons or the fluorinated hydrocarbons can be employed, selection of the appropriate refrigerant being readily made on the basis of published data respecting such refrigerants.

In the following specific examples in which a 100,000 kilowatt power plant is established as a suitable product of the system, Freon 12 is employed in the first example and Freon 502 in the second.

EXAMPLE I

It can be summarized from the previous material describing the system in detail that water at 0° C. is employed, that 0.60 Q g/sec ice is formed, and that the net power output is 6.13 Q cal/sec. Thus 6.13 Q cal/sec must equal 100,000 kW and Q will equal 3.9 × 10$^6$ g/sec. The system will require 3,903,000 g/sec of Freon 12 to drive the turbine. Vaporizing this Freon will produce 1,955,000 g/sec of ice to which a eutectic amount of calcium chloride is added; 367,000 g/sec of excess ice is produced.

Heat input at 0° C. = 0.60 Q g/sec × 80 cal/g = 48 Q 1.87 × 10$^8$ cal/sec.

The net work output = $\frac{10^8 W}{4.185}$ Joules/cal = 2.39 × 10$^7$ cal/sec

Efficiency of the system = $\frac{2.39 \times 10^7 \text{ cal/sec}}{1.87 \times 10^8 \text{ cal/sec}} = 0.128$;

(reduced by inherent condensation of 3% by volume of the FREON 12 in the turbine to 0.082); the Carnot efficiency of the system is $$1 - \frac{(273 - 55) °K.}{273 °K.} = 1 - 0.798 = 0.201,$$

and the ratio of excess ice produced to total ice produced is $$\frac{0.094 Q}{(0.506 + 0.094) Q} = 0.157$$

EXAMPLE II

In a second example of a 100,000 Kilowatt plant, Freon 502 is employed as the working fluid. Freon 502 has a normal boiling point of −45.6° C., a specific heat averaging 0.254 cal/g × °C. between −45.6° C. and 0° C. and 0.267 cal/g × °C. between −55° C. and −45.6° C., and a latent heat of vaporization of 41.2 cal/g. In this system, liquid Freon 502 at −55° C. and 5.66 atm is brought into heat-exchange contact with fresh water at 0° C. Freon 502 is heated to 0° C. and vaporized at the said pressure of 5.66 atm. To supply a turbine producing 100,000 kW it is necessary to circulate 2,140,000 g/sec of Freon 502. The system produces 1,055,000 g/sec of ice which must be mixed with $CaCl_2.6H_2O$ to form a eutectic composition melting at −55° C. for condensation of the expanded working vapor of Freon 502. Excess ice in the amount of 274,000 g/sec is produced. In order to pump 2,140,000 g/sec of liquid Freon 502 condensate to a pressure of 5.66 atm it is necessary to supply 814 kW to the pump. In addition 1253 kW has been allowed for process work and nominal energy losses in the system.

The efficiency of the above system on the calculated basis of $$\frac{11.17 Q \text{ cal/sec net power output}}{49.7 Q \text{ cal/sec net boiler heat}} = 0.225,$$

subject to a reduction to 0.128 resulting from an inherent condensation of 4.5 percent by volume of the FREON 502 in the turbine, but offset by the ambient available sensible heat in water at 15°–25° C.;

the Carnot efficiency = 0.201; and the ratio of excess ice produced to total ice produced $$= \frac{0.128 Q}{(0.493 + 0.128) Q} = 0.206.$$

It will be apparent from a reading of the specification that the system of the invention is adapted to waters of varying temperature and condition such as saline content, and that the efficiency of the system lies in extracting the latent heat of fusion from water and converting it to useful work. Thus any working fluid which boils at a temperature substantially below the freezing point of water is available for use in the present invention. Eutectic mixtures of salts and ice having melting points substantially below the said boiling point of the working fluid cooperate in the system to condense the working fluid and prepare it for boiling under pressure by an exchange of latent heats of phase transition with water and release of the vapors under pressure to an expansion turbine for conversion to mechanical shaft energy and preferably electrical energy.

What is claimed is:

1. A self sustaining process of recovery of the heat content of water and of fresh water therefrom, and of conversion of said heat content to available kinetic energy, the said process comprising:

bringing water existing in a state selected from the group consisting of saline water, brackish water and contaminated water into heat-exchange contact at a temperature of at least 0° C. with a liquid working fluid having a boiling point below 0° C. and thereby boiling the working fluid under autogenous pressure and freezing the water to form ice consisting of frozen fresh water;

releasing the so-vaporized working fluid from said autogenous pressure in an expansion engine and thus expanding adiabatically the said vaporized fluid, cooling the same and converting heat absorbed from the water into available kinetic energy;

withdrawing the expanded and cooled working-fluid vapor from said engine and condensing the vapor by heat-exchange contact with a eutectic composition of a eutectic-forming substance and the ice formed in the first-said heat exchange less product ice in an amount equivalent to the cooling of expanded vapor of working fluid in the expansion engine;

removing product ice from the first-said heat exchange, washing the same with an increment of melt, and recovering the remainder as fresh water; and pumping the so-condensed working fluid into heat-exchange contact with an additional quantity of water in a selected state and against the said autogenic vapor pressure of the working fluid at substantially the water temperature.

2. The process of claim 1 wherein:
the water is a saline water and the working fluid is a halogenated fluorocarbon having a boiling point substantially below 0° C.

3. The process of claim 1 wherein:
the eutectic-forming substance is calcium chloride and the eutectic composition has a melting point of about −55° C.

4. The process of claim 3 in which calcium chloride and so-produced ice less product ice is brought into heat exchange contact with effluent eutectic composition from the condensing step and cooled prior to introduction into said condensing step.

5. A system for the recovery of available ambient heat and its conversion to a useful form of energy comprising the steps of:
extracting the heat of fusion of water by means of heat exchange therefrom to a working fluid in liquid phase at a temperature below 0° C., the said working fluid having a boiling point below, and being superheated at, the freezing point of water;
by said heat exchange freezing the water, and vaporizing, and superheating the vapor of, the working fluid under autogenous pressure to substantially the initial temperature of the water;
releasing the said vapor from said autogenous pressure in an expansion engine and adiabatically expanding the vapor whereby the expanding vapor drives the engine and effects a conversion to available mechanical shaft energy;
removing from the engine vaporized working fluid cooled by said adiabatic expansion and bringing the same into heat exchange contact with a cooling medium generated within the said system and thereby removing heat of vaporization from, and condensing, the vaporized working fluid to form said working fluid in liquid form; and
pumping said liquified working fluid into heat exchange contact with water against the autogenous pressure of vaporized, superheated working fluid.

6. The system of claim 5 wherein:
the working fluid is a fluorinated hydrocarbon which boils, at one atmosphere absolute pressure, at a temperature of at most 0° C.

7. The system of claim 5 wherein:
the cooled working-fluid vapor is condensed by heat-exchange contact with a eutectic composition of ice that is formed by said extracting of the heat of fusion of water, and of a eutectic forming substance, the composition having a melting point temperature substantially below the condensation temperature of said working fluid.

8. The system of claim 7 wherein:
the eutectic-forming substance is a salt selected from the group consisting of calcium chloride, cupric chloride, ferric chloride, potassium carbonate, magnesium chloride, sodium chloride, and zinc chloride.

9. The system of claim 8 wherein:
the selected eutectic-forming substance is calcium chloride.

10. The system of claim 7 wherein:
ice newly produced in the said heat exchange with working fluid in liquid phase is brought into heat exchange relationship with an effluent from the stage of condensing working fluid, said effluent being said eutectic composition in melted form.

11. The system of claim 10 wherein:
said effluent eutectic composition is removed from the said heat exchange relationship with said newly produced ice and is evaporated to recover therefrom dried eutectic-forming substance available for preparation of fresh eutectic composition.

12. The system of claim 11 wherein:
said evaporation is accomplished by use of solar energy.

13. A process of recovery of the heat content of water, including its latent heat of fusion, and of conversion of said heat to available kinetic energy, the said process comprising:
bringing a working fluid in the liquid state and consisting of a halogenated fluorocarbon that boils at a temperature below 0° C. into heat exchange relationship with water thereby extracting the latent heat of fusion of the water, forming ice, and heating the working fluid to a temperature substantially that of the water and vaporizing the said working fluid at the said temperature under autogenous pressure;
expanding adiabatically the vaporized fluid in an expansion turbine thereby converting the kinetic energy of the expanding vapor to mechanical shaft energy;
condensing said expanded, cooled working-fluid vapors effluent of the expansion turbine by heat-exchange contact with a eutectic mixture of ice that is formed by said extracting of said latent heat of water and calcium chloride at a temperature of about −55° C.; and
pumping said condensed working fluid against said autogenic pressure into heat-exchange contact with an additional quantity of water at a temperature of at least 0° C.

* * * * *

UNITED STATES PATENT AND TRADEMARK OFFICE
CERTIFICATE OF CORRECTION

PATENT NO. : 4,283,211

DATED : August 11, 1981

INVENTOR(S) : Stefan Ehrlich and William L. Levenson

It is certified that error appears in the above-identified patent and that said Letters Patent are hereby corrected as shown below:

Col. 2, line 1, delete "same,)" and substitute therefor --same.);

Col. 4, line 68, delete "in" and substitute therefor --of--;

Col. 6, line 41, delete "cal $10^{-8}$";

Col. 7, line 12, delete "29.8" and substitute therefor --58.8--;

Col. 8, line 50, delete "29.8" and substitute therefor --58.8--;

Col. 8, line 51, delete "70.2" and substitute therefor --41.2--;

Col. 8, line 57, delete "0.42" and substitute therefor --1.43--;

Col. 8, line 59, delete "8.4 = 88.4" and substitute therefor --28.3 = 108.3--;

Col. 8, delete lines 61, 62, 63 and 64 in their entirety and insert --

$$Q \text{ ice} = \frac{44.7 \text{ cal/g}}{108.3 \text{ cal/g}} = 0.413 \text{ g/sec ice.} --;$$

Col. 9, line 42, delete "3,903,000" and substitute therefor --3,900,000--;

UNITED STATES PATENT AND TRADEMARK OFFICE
CERTIFICATE OF CORRECTION

PATENT NO. : 4,283,211

DATED : August 11, 1981

INVENTOR(S) : Stefan Ehrlich and William L. Levenson

It is certified that error appears in the above-identified patent and that said Letters Patent are hereby corrected as shown below:

Col. 9, line 44, delete "1,955,000" and substitute therefor --1,611,000--;

Col. 9, line 45, delete "367,000" and substitute therefor --728,000--;

Col. 9, delete lines 65, 66 and 67 in their entirety and insert --

$$\frac{0.187 \; Q}{(0.413 + 0.187) \; Q} = 0.312.--;$$

Col. 10, line 14, delete "1,055,000" and substitute therefor --840,000--;

Col. 10, line 18, delete "274,000" and substitute therefor --464,000--; and

UNITED STATES PATENT AND TRADEMARK OFFICE
CERTIFICATE OF CORRECTION

PATENT NO. : 4,283,211    Page 3 of 3
DATED : August 11, 1981
INVENTOR(S) : Stefan Ehrlich and William L. Levenson It is certified that error appears in the above-identified patent and that said Letters Patent are hereby corrected as shown below:

Col. 10, delete lines 36, 37, 38 and 39 in their entirety and insert --

$$= \frac{0.217 \, Q}{(0.392 + 0.217) \, Q} = 0.356. --.$$

Signed and Sealed this

Fifteenth Day of December 1981

[SEAL]

Attest:

GERALD J. MOSSINGHOFF

Attesting Officer    Commissioner of Patents and Trademarks